United States Patent
James et al.

(10) Patent No.: US 6,421,745 B1
(45) Date of Patent: Jul. 16, 2002

(54) ASYNCHRONOUS CONNECTIONS WITH SCATTERING PAGE TABLES FOR TRANSMITTING DATA FROM A PRODUCER DEVICE TO A CONSUMER DEVICE OVER AN IEEE 1394 SERIAL DATA BUS

(75) Inventors: David V. James, Palo Alto; Hisato Shima, Saratoga; Bruce Fairman, Woodside, all of CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/548,050

(22) Filed: Apr. 12, 2000

Related U.S. Application Data (60) Provisional application No. 60/128,881, filed on Apr. 12, 1999, now abandoned.

(51) Int. Cl.$^7$ ............................................... G06F 13/14
(52) U.S. Cl. ......................................... 710/34; 709/200
(58) Field of Search ........................ 710/33–35, 48–50, 710/56, 57; 709/212, 200

(56) References Cited

U.S. PATENT DOCUMENTS 4,713,702 A  12/1987  Ishihara et al. ................ 360/79

(List continued on next page.)

FOREIGN PATENT DOCUMENTS

EP   0 428 111 A2   11/1990   ............ G06F/13/28

OTHER PUBLICATIONS

Michael Teener et al., "A Bus on a Diet—The Serial Bus Alternative, An Introduction to the P1394 High performance Serial Bus" Apple Computer, Inc. Santa Clara, CA, Pub. Date.: Feb. 24, 1992, pp. 316–321.

P134 Standard For A High Performance Serial Bus, IEEE, 1995.

"The IEEE–1394 High Speed Serial Bus," R.H.J. Bloks, Philips Journal Of Research, vol. 50, No. 1/2, pp. 209–216, 1996.

*Primary Examiner*—Paul R. Myers
(74) *Attorney, Agent, or Firm*—Haverstock & Owens LLP (57) ABSTRACT

Both small frames and large frames of data are transmitted from a producer device to a consumer device over an IEEE 1394 serial data bus. The small frames of data are preferably transmitted to a small frame buffer associated with a plug at the consumer device. Each transfer of a small frame generates an interrupt at the consumer device when the transfer is complete. For the transfer of large frames of data, the consumer device programs an array of page table entries into the plug control register of the producer device, prior to a transfer of a large frame of data. Each of the page table entries includes a starting address of a memory page at the consumer device to which data can be written. Together, these memory pages specified by the page table entries form a large frame buffer at the consumer device for receiving a large frame of data from the producer device. Preferably, the array of page table entries can be updated by the consumer device, as appropriate, between frame transfers. When transferring a large frame of data, the producer device begins writing to the first page specified in the first page table entry and continues in order, writing to the pages specified in the page table entries, until the entire frame has been transferred. When the entire large frame of data has been transferred, the producer device then updates the plug control register at the consumer device to notify the consumer device that the entire large frame has been transferred.

52 Claims, 6 Drawing Sheets

U.S. PATENT DOCUMENTS

| | | | | |
|---|---|---|---|---|
| 4,930,065 A | * | 5/1990 | McLagan et al. | 710/50 |
| 5,315,705 A | | 5/1994 | Iwami et al. | 395/200 |
| 5,408,501 A | | 4/1995 | Cornaby | 375/260 |
| 5,434,860 A | | 7/1995 | Riddle | 370/84 |
| 5,444,709 A | | 8/1995 | Riddle | 370/94.1 |
| 5,448,698 A | | 9/1995 | Wilkes | 395/200.01 |
| 5,517,494 A | | 5/1996 | Green | 370/60 |
| 5,519,701 A | | 5/1996 | Colmant et al. | 370/60.1 |
| 5,619,544 A | | 4/1997 | Lewis et al. | 375/377 |
| 5,661,848 A | | 8/1997 | Bonke et al. | 395/439 |
| 5,668,952 A | | 9/1997 | Slane | 395/200.75 |
| 5,729,755 A | | 3/1998 | Turski | 395/800 |
| 5,748,911 A | | 5/1998 | Maguire et al. | 395/281 |
| 5,758,075 A | | 5/1998 | Graziano et al. | 395/200.8 |
| 5,815,668 A | | 9/1998 | Hashimoto | 395/200.68 |
| 5,835,725 A | | 11/1998 | Chiang et al. | 395/200.58 |
| 5,867,656 A | | 2/1999 | Iwasaki et al. | 395/200.45 |
| 5,940,592 A | | 8/1999 | Ioki et al. | 395/200.3 |
| 5,941,964 A | | 8/1999 | Young et al. | 710/100 |
| 5,991,520 A | | 11/1999 | Smyers et al. | 395/280 |
| 6,034,964 A | | 3/2000 | Fukushima et al. | 370/401 |

* cited by examiner

Fig. 5 iAPRsf

*Fig. 6* iAPRpf

*Fig. 7* oAPRsf

*Fig. 8* oAPRpf

ASYNCHRONOUS CONNECTIONS WITH SCATTERING PAGE TABLES FOR TRANSMITTING DATA FROM A PRODUCER DEVICE TO A CONSUMER DEVICE OVER AN IEEE 1394 SERIAL DATA BUS

RELATED APPLICATIONS

This application claims priority under 35 U.S.C. §119(e) of the U.S. provisional application Ser. No. 60/128,881 filed on Apr. 12, 1999 now abandoned and entitled "Asynchronous Connections With Scattering Page Tables." The provisional application Ser. No. 60/128,881 filed on Apr. 12, 1999 and entitled "Asynchronous Connections With Scattering Page Tables" is also hereby incorporated by reference.

FIELD OF THE INVENTION

The present invention relates to the field of transmitting data between two or more devices. More particularly, the present invention relates to the field of transmitting data and controlling data transfer operations between devices over a bus structure.

BACKGROUND OF THE INVENTION

The IEEE standard, "IEEE Std 1394-1995 Standard For A High Performance Serial Bus," is an international standard for implementing an inexpensive high-speed serial bus architecture which supports both asynchronous and isochronous format data transfers. Isochronous data transfers are real-time transfers which take place such that the time intervals between significant instances have the same duration at both the transmitting and receiving applications. Each packet of data transferred isochronously is transferred in its own time period. An example of an ideal application for the transfer of data isochronously would be from a video recorder to a television set. The video recorder records images and sounds and saves the data in discrete chunks or packets. The video recorder then transfers each packet, representing the image and sound recorded over a limited time period, during that time period, for display by the television set. The IEEE 1394 serial bus architecture provides multiple channels for isochronous data transfer between applications. A six bit channel number is broadcast with the data to ensure reception by the appropriate application. This allows multiple applications to simultaneously transmit isochronous data across the bus structure. Asynchronous transfers are traditional data transfer operations which take place as soon as possible and transfer an amount of data from a source to a destination.

The IEEE 1394 standard provides a high-speed serial bus for interconnecting digital devices thereby providing a universal I/O connection. The IEEE 1394 standard defines a digital interface for the applications thereby eliminating the need for an application to convert digital data to analog data before it is transmitted across the bus. Correspondingly, a receiving application will receive digital data from the bus, not analog data, and will therefore not be required to convert analog data to digital data. The cable required by the IEEE 1394 standard is very thin in size compared to other bulkier cables used to connect such devices. Nodes can be added and removed from an IEEE 1394 bus while the bus is active. If a device is so added or removed the bus will then automatically reconfigure itself for transmitting data between the then existing nodes. A node is considered a logical entity with a unique address on the bus structure. Each node provides an identification ROM, a standardized set of control registers and its own address space.

Figure 1:
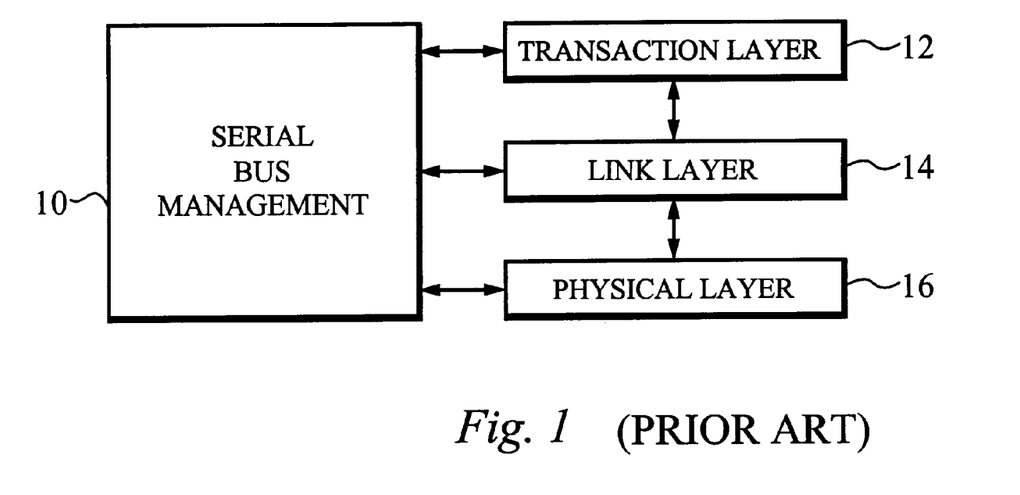
FIG. 1 illustrates a protocol defined by the IEEE 1394 standard.

The IEEE 1394 standard defines a protocol as illustrated in FIG. 1. This protocol includes a serial bus management block 10 coupled to a transaction layer 12, a link layer 14 and a physical layer 16. The physical layer 16 provides the electrical and mechanical connection between a device or application and the IEEE 1394 cable. The physical layer 16 also provides arbitration to ensure that all devices coupled to the IEEE 1394 bus have access to the bus as well as actual data transmission and reception. The link layer 14 provides data packet delivery service for both asynchronous and isochronous data packet transport. This supports both asynchronous data transport, using an acknowledgement protocol, and isochronous data transport, providing real-time guaranteed bandwidth protocol for just-in-time data delivery. The transaction layer 12 supports the commands necessary to complete asynchronous data transfers, including read, write and lock. The serial bus management block 10 contains an isochronous resource manager for managing isochronous data transfers. The serial bus management block 10 also provides overall configuration control of the serial bus in the form of optimizing arbitration timing, assignment of the cycle master, assignment of isochronous channel and bandwidth resources and basic notification of errors.

The IEEE 1394 trade association standard, "1394TA IICP Specification for the Instrument & Industrial Control Protocol," Specification 1.00, Oct. 8, 1999, is an international standard for efficient asynchronous communication to electronic instrumentation and industrial control devices using the IEEE 1394 serial bus. The protocol established by the 1394TA IICP specification uses a dual-duplex plug structure for transfer of data and command/control sequences. According to the 1394TA IICP specification, all communication is flow controlled between a producer device and a consumer device. A producer device is a device that writes data to a consumer device. A consumer device is a device that receives data from a producer device.

Figure 2:
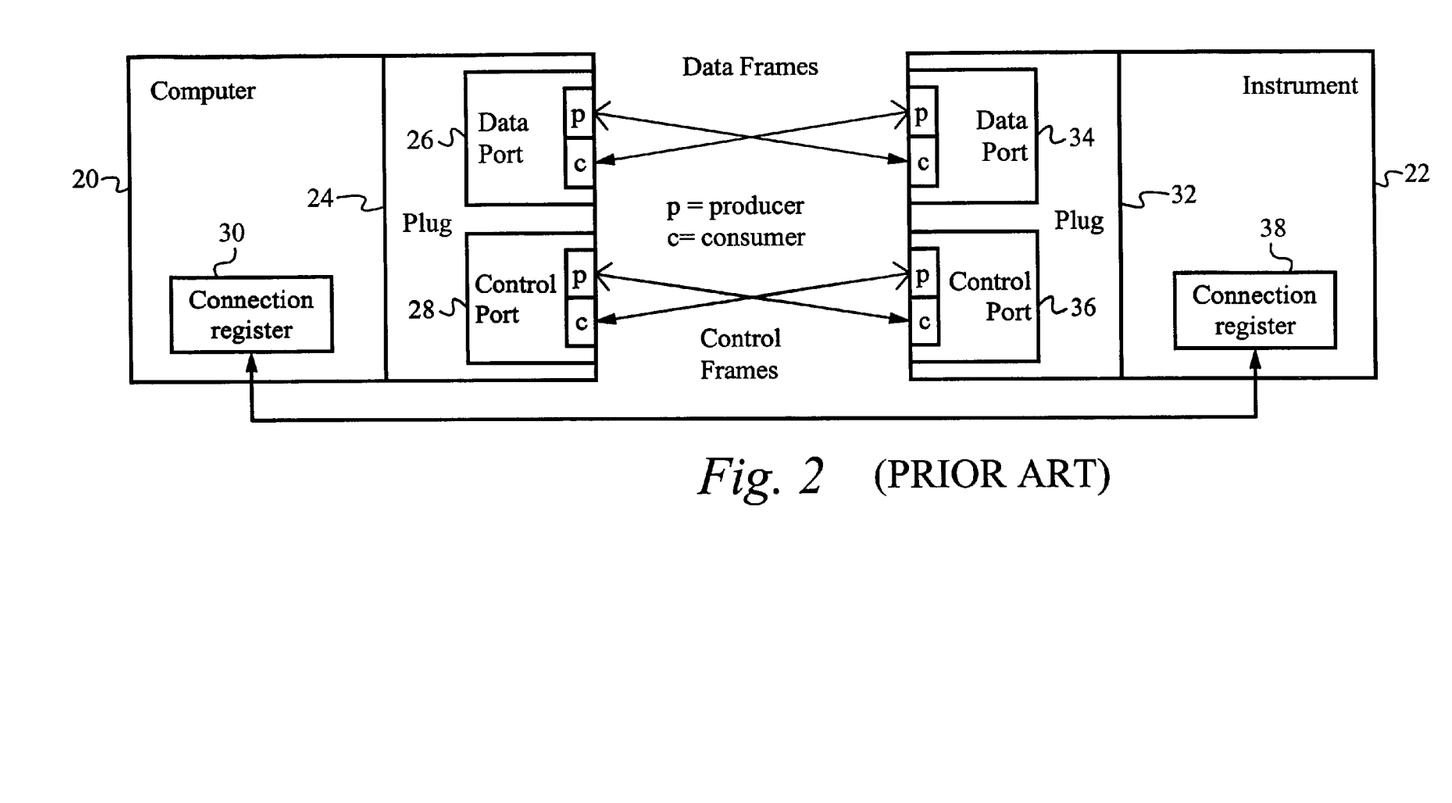
FIG. 2 illustrates a typical 1394TA IICP connection between a computer and an instrument.

A typical 1394TA IICP connection between a computer and an instrument is illustrated in FIG. 2. The computer 20 is coupled to the instrument 22 by an IEEE 1394-1995 cable. The connection illustrated in FIG. 2 is a virtual representation of the data flow between the computer 20 and the instrument 22. The computer 20 includes a connection register 30 and a plug 24. The instrument 22 includes a connection register 38 and a plug 32. The connection registers 30 and 38 communicate connection requests and responses related to data transmissions between the plugs 24 and 32.

The concept of the plugs 24 and 32 and the plug control registers 30 and 38 is used to manage and control the attributes of asynchronous data flows over a 1394TA IICP connection. It should be noted that plugs do not physically exist on a 1394TA IICP device, but the concept of a plug is used to establish an analogy with existing devices where each flow of information is routed through a physical plug.

Each of the plugs 24 and 32 contain a data port and a control port. The plug 24 includes the data port 26 and the control port 28. The plug 32 includes the data port 34 and the control port 36. Each port within a plug allows duplex communications with the connected node. Through the data port 26, the computer 20, acting as producer, can send data to the instrument 22, acting as consumer, and can also receive data as a consumer device from the instrument 22, acting as a producer device. Correspondingly, through the data port 34, the instrument 22, acting as producer, can send data to the computer 20, acting as consumer, and can also receive data as a consumer device from the computer 20, acting as a producer device.

Control bytes are transferred from either the computer 20 or the instrument, whichever is acting as a producer of control bytes, to the other device, acting as a consumer of control bytes. Control bytes are control messages, interrupts, triggers and commands sent between the devices. The control port within the plug allows the data path to remain a pure data path.

The connection arrangement illustrated in FIG. 2 is a dual-duplex plug arrangement as both of the plugs 24 and 32 can send data and also include separate data and control ports. Data can also be sent through duplex plugs in which two devices are connected together and either of the devices can send data to the other device. A duplex plug sends data and control information through the same port instead of having separate data and control ports as in the dual-duplex plug arrangement. A simplex operation results if one of the plugs of a connected device does not produce frames and does not have the ability to transmit frame data.

A plug is a data structure including private memory and public memory. The plug private memory includes information necessary in setting up and maintaining a connection, including plug state information about the connected node. The plug public memory is mapped to IEEE 1394 memory space and can be updated by the connected node. To transfer data from a producer device to a consumer device, the consumer device first notifies the producer device through a write operation that it has space available in an associated segment buffer to receive data. Using a write transaction, the producer device then transfers the data to the segment buffer at the consumer device. Once the data is transferred, the producer device then confirms that the data has been transferred by a write transaction to the control register at the consumer device. This write operation causes an interrupt to occur at the consumer device, notifying the consumer device that the data has been transferred.

In a previous version of the 1394TA IICP specification, the output plug or data port on the producer device in a data transfer had up to 15 control registers and could be multicast to 14 concurrent input plugs, or data ports on the consumer devices. Each of the input plugs had an associated segment buffer to which data could be written. In this configuration, the segment buffer and control register associated with an input plug were contiguous making it difficult to differentiate between write operations to segment buffers which are directly mapped and write operations to register addresses which cause an interrupt. A further limitation to this approach, is that it cannot efficiently support large discontiguous transfers, due to constraints regarding the size of the segment buffer. The segment buffer is limited in size, typically to 4 Kbytes, because system software cannot allocate pages of memory contiguously.

In another previous version of the 1394TA IICP specification, the segment buffer and control register associated with an input plug were separated in the memory space, so that each input plug had two distinct address components. However, this approach also does not solve the problem associated with transferring large amounts of data and the inability to allocate pages contiguously.

SUMMARY OF THE INVENTION

Both small frames and large frames of data are transmitted from a producer device to a consumer device over an IEEE 1394 serial data bus. The small frames of data are preferably transmitted to a small frame buffer associated with a plug at the consumer device. Each transfer of a small frame generates an interrupt at the consumer device when the transfer is complete. For the transfer of large frames of data, the consumer device programs an array of page table entries into the plug control register of the producer device, prior to a transfer of a large frame of data. Each of the page table entries includes a starting address of a memory page at the consumer device to which data can be written. Together, these memory pages specified by the page table entries form a large frame buffer at the consumer device for receiving a large frame of data from the producer device. Preferably, the array of page table entries can be updated by the consumer device, as appropriate, between frame transfers. When transferring a large frame of data, the producer device begins writing to the first page specified in the first page table entry and continues in order, writing to the pages specified in the page table entries, until the entire frame has been transferred. When the entire large frame of data has been transferred, the producer device then updates the plug control register at the consumer device to notify the consumer device that the entire large frame has been transferred.

In one aspect of the present invention, a method of transferring data between a transmitting device and a receiving device includes the steps of sending a communication from the receiving device to the transmitting device including a notification that the receiving device is ready to receive data and a plurality of page table entries each corresponding to a location in memory of the receiving device to which the data is to be written and transferring the data from the transmitting device to the receiving device in one or more transactions to successive ones of the locations in memory corresponding to the page table entries. The method further includes the step of sending a notification from the transmitting device to the receiving device upon completion of transmission of the data. The method further includes the steps of determining if a single transaction will include all of the data and transferring the data to a small frame buffer at the receiving device if it is determined that the single transaction will include all of the data. The transfer of data to the small frame buffer causes an interrupt to occur at the receiving device. Preferably, the small frame buffer is a buffer within a plug control register. Alternatively, an address of the small frame buffer is specified by a designated one of the page table entries. The locations in memory corresponding to the page table entries are not contiguous. Together, the locations in memory corresponding to the page table entries form a large frame buffer. The page table entries are stored at the transmitting device in a control register. The method further includes the step of updating the page table entries before a transfer of a next frame. The one or more transactions include an extended transaction code specifying whether or not an interrupt is to occur upon completion of the transaction. A final transaction within a frame of data includes the extended transaction code specifying that the interrupt is to occur upon completion of the transaction. The transmitting device and the receiving device are coupled together by an IEEE 1394 serial bus. The transmitting device and the receiving device operate according to a version of the 1394TA IICP specification.

In another aspect of the present invention, a method of transferring data between a transmitting device and a receiving device includes the steps of sending a small frame control communication from the receiving device to the transmitting device including a notification that the receiving device is ready to receive a small frame of data, sending a large frame control communication from the receiving device to the transmitting device including a notification that the receiving device is ready to receive a large frame of data and a plurality of page table entries each corresponding to a location in memory of the receiving device to which portions of the large frame of data are to be written, receiving a frame of data from an application at the transmitting device, determining if the received frame of data is a small frame of data or a large frame of data, transferring the received frame of data to a small frame buffer at the receiving device if it is determined that the received frame of data is a small frame of data and transferring the received frame of data from the transmitting device to the receiving device in multiple transactions to successive ones of the locations in memory corresponding to the page table entries if it is determined that the received frame of data is a large frame of data. The method further includes the step of sending a notification from the transmitting device to the receiving device upon completion of transmission of the large frame of data. The transfer of data to the small frame buffer causes an interrupt to occur at the receiving device. The small frame buffer is a buffer within a plug control register. An address of the small frame buffer is specified by a designated one of the page table entries. Together, the locations in memory corresponding to the page table entries form a large frame buffer. The locations in memory corresponding to the page table entries are not contiguous. The page table entries are stored at the transmitting device in a control register. A small frame of data is transferred in a single transaction and a large frame of data is transferred in more than one transaction. The method further includes the step of updating the page table entries before a transfer of a next frame. The transmitting device and the receiving device are coupled together by an IEEE 1394 serial bus. The transmitting device and the receiving device operate according to a version of the 1394TA IICP specification.

In yet another aspect of the present invention, a transmitting device configured to transmit data to a receiving device includes an interface configured for coupling to the receiving device to transmit frame data to the receiving device and receive control data from the receiving device and a register coupled to the interface to store the control data, wherein the register includes a plurality of page table entries which are programmed by the receiving device and hold address data corresponding to locations in memory of the receiving device to which a frame of data is to be written, wherein the transmitting device transmits the frame of data to the receiving device in one or more transactions through the interface to successive ones of the locations in memory corresponding to the page table entries. The locations in memory corresponding to the page table entries are not contiguous. Together, the locations in memory corresponding to the page table entries form a large frame buffer. The receiving device has the ability to update the page table entries between transfer of each frame. The one or more transactions include an extended transaction code specifying whether or not an interrupt is to occur upon completion of the transaction. A final transaction within a frame of data includes the extended transaction code specifying that the interrupt is to occur upon completion of the transaction. The transmitting device is configured to transmit data to the receiving device over an IEEE 1394 serial bus. The transmitting device and the receiving device operate according to a version of the 1394TA IICP specification.

In another aspect of the present invention, a receiving device configured to receive data from a transmitting device includes an interface configured for coupling to the transmitting device to receive frame data from the transmitting device and transmit control data to the transmitting device and a plurality of memory pages which together form a frame buffer, each of the memory pages having a corresponding address, wherein the receiving device transmits the control data to the transmitting device including the addresses of the plurality of memory pages and the transmitting device will transmit the frame data to the receiving device in one or more transactions through the interface to successive ones of the plurality of memory pages. The receiving device further includes a small frame buffer coupled to the interface for storing a small frame of data transmitted from the transmitting device in a single transaction. The small frame buffer is a buffer within a plug control register. An address of the small frame buffer is specified by a designated one of the page table entries. The locations of plurality of memory pages are not contiguous. The page table entries are stored at the transmitting device in a control register. The receiving device has the ability to update the page table entries between transfer of each frame. The one or more transactions include an extended transaction code specifying whether or not an interrupt is to occur upon completion of the transaction. A final transaction within a frame of data includes the extended transaction code specifying that the interrupt is to occur upon completion of the transaction. The transmitting device is configured to transmit data to the receiving device over an IEEE 1394 serial bus. The transmitting device and the receiving device operate according to a version of the 1394TA IICP specification.

In still yet another aspect of the present invention, a communication system includes a transmitting device including a first interface for transmitting frame data and receiving control data and a first control register coupled to the first interface to store the control data including a plurality of page table entries and a receiving device including a second interface coupled to the first interface to receive the frame data from the transmitting device and transmit control data to the transmitting device, a second control register coupled to the second interface and a plurality of memory pages which together form a large frame buffer, each of the memory pages having a corresponding address, wherein the receiving device transmits the control data to the transmitting device including the addresses of the plurality of memory pages which are stored in the plurality of page table entries and further wherein the transmitting device transmits the frame data to the receiving device in one or more transactions to be written into successive ones of the plurality of memory pages. The receiving device further comprises a small frame buffer coupled to the second interface for storing a small frame of data transmitted from the transmitting device in a single transaction. The small frame buffer is included within the second control register. An address of the small frame buffer is specified by a designated one of the page table entries. The plurality of memory pages are not contiguous. The receiving device has the ability to update the page table entries between transfer of each frame. The one or more transactions include an extended transaction code specifying whether or not an interrupt is to occur upon completion of the transaction. A final transaction within a frame of data includes the extended transaction code specifying that the interrupt is to occur upon completion of the transaction. The first and second interfaces are coupled together by an IEEE 1394 serial bus. The transmitting device and the receiving device both operate according to a version of the 1394TA IICP specification.

DETAILED DESCRIPTION OF THE PREFERRED EMBODIMENT

The apparatus and method of the present invention, allows a consumer device to specify to a producer device an array of page addresses or page table entries in memory to which data can be transferred. This set of page table entries is programmed into the connection register of the producer device, associated with a plug, by the consumer device prior to the transfer of a large frame of data. Preferably, the array of page table entries can be updated, as appropriate, by a consumer device between frame transfers, thereby allowing the consumer device to change the memory spaces dedicated to large frame transfers with each new frame. The array of page table entries is preferably written into the connection register of the producer device through a write transaction through the control port of the plug, when informing the plug at the producer device of the space available condition. This array of page addresses does not have to be contiguous, thereby allowing the transfer of much larger frames of data between a producer device and a consumer device. The array of page addresses also allows the control register associated with a plug and the segment buffer pages associated with the plug to be separated in the device's memory.

For small frame transfers, a single page or segment buffer is associated with the plug at the consumer device. Preferably, the small frame segment buffer is a dedicated memory space within the register associated with the plug at the consumer device. Alternatively, the small frame segment buffer can be any other appropriate block of memory and can be specified by a page table entry programmed into the connection register. Each small frame transfer generates an interrupt when the write operation is complete. Accordingly, there are no handshaking write transactions needed for the transfer of a small frame buffer, allowing the transfer of small frame buffers to be more efficient.

Small frame transfers are sent in one IEEE 1394 transaction. When ready to receive small frames, the consumer device updates fields within the connection register of the producer device to notify the producer device that the consumer device is ready to receive more small frames. The producer device then waits until it receives a request from an application layer to transfer a small frame. When a producer device receives such a request from an application layer, the producer device checks to ensure that the frame can be sent as a small frame. If the frame can be sent as a small frame, the producer device then writes the frame to the small frame buffer in the connection register, offset by an amount of data equal to the amount of data transferred to the small frame space since the last register update. This write operation then causes an interrupt to occur at the consumer device. The consumer device then receives the small frame and forwards it to the appropriate application. If the frame cannot be sent as a small frame, the producer device then writes the frame into the pages of memory specified in the page table entries, through a series of write operations. When transferring a large frame of data, the producer device starts writing to the page specified in the first page table entry and continues in order, writing to the pages specified in the page table entries, until the entire frame has been transferred.

A producer device writes frame contents to consumer segment buffers on the connected node, specified by the page addresses written into the connection register of the producer device. Correspondingly, when receiving a large frame, a consumer device utilizes one or more consumer segment buffers. Within the connection register of the producer device, the consumer device updates a LargeFrameProducer register when the consumer device is ready to receive large frame content. A LargeFrameTableElement array within the connection register of the producer device consists of PageTableElement registers which point to consumer segment buffers mapped to IEEE 1394 memory space on the connected node. The consumer segment buffers are then used to store the data within the large frame transfer.

Figure 3:
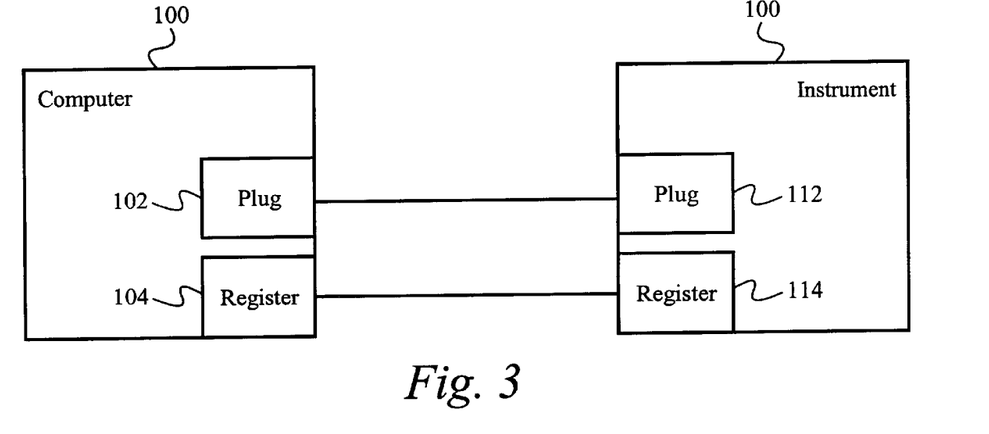
FIG. 3 illustrates an exemplary 1394TA IICP connection between a computer and an instrument.

An exemplary 1394TA IICP connection between a computer and an instrument is illustrated in FIG. 3. The computer 100 includes a plug 102 and an associated control register 104. The instrument 110 includes a plug 112 and an associated control register 114. The plugs 102 and 112 are coupled together to transmit frame data and control data. The plugs are in any appropriate configuration including simplex, duplex and dual-duplex. In the exemplary connection illustrated in FIG. 3, either of the computer 100 or the instrument 110 could be the producer device or the consumer device.

Figure 4:
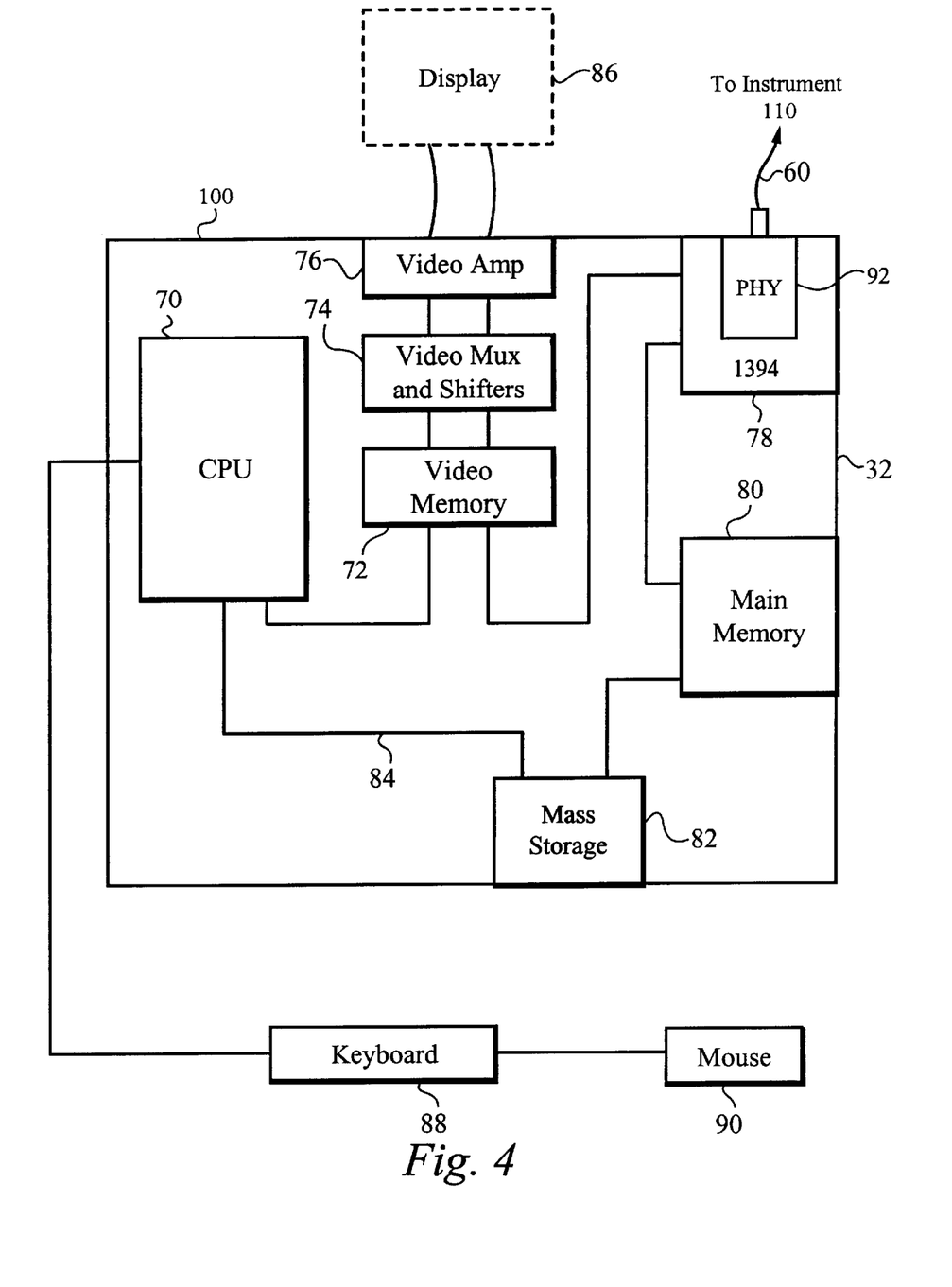
FIG. 4 illustrates an exemplary block diagram of the components included within the computer system 100.

An exemplary block diagram of the components included within the computer system 100 is illustrated in FIG. 4. The computer system 100 includes a central processor unit (CPU) 70, a main memory 80, a video memory 72, a mass storage device 82 and an IEEE 1394-1995 interface circuit 78, all coupled together by a conventional bidirectional system bus 84. The interface circuit 78 includes the physical interface circuit 92 for sending and receiving communications to the instrument 110 over the IEEE 1394-1995 serial bus 60. In the preferred embodiment of the present invention, the interface circuit 78 is implemented on an IEEE 1394-1995 interface card within the computer system 100. However, it should be apparent to those skilled in the art that the interface circuit 78 can be implemented within the computer system 100 in any other appropriate manner, including building the interface circuit onto the motherboard itself.

The mass storage device 82 may include both fixed and removable media using any one or more of magnetic, optical or magneto-optical storage technology or any other available mass storage technology. The system bus 84 contains an address bus for addressing any portion of the memory 72 and 80. The system bus 84 also includes a data bus for transferring data between and among the CPU 70, the main memory 80, the video memory 72, the mass storage device 82 and the interface circuit 78.

The computer system 100 is also coupled to a number of peripheral input and output devices including the keyboard 88, the mouse 90 and possibly the associated display 86. The keyboard 88 is coupled to the CPU 70 for allowing a user to input data and control commands into the computer system 100. A conventional mouse 90 is coupled to the keyboard 88 for manipulating graphic images on the display 86 as a cursor control device. As is well known in the art, the mouse 90 can alternatively be coupled directly to the computer system 100 through a serial port.

A port of the video memory 72 is coupled to a video multiplex and shifter circuit 74, which in turn is coupled to a video amplifier 76. The video amplifier 76 drives the display 86, when it is being used. The video multiplex and shifter circuitry 74 and the video amplifier 76 convert pixel data stored in the video memory 72 to raster signals suitable for use by the display 86.

Figure 5:
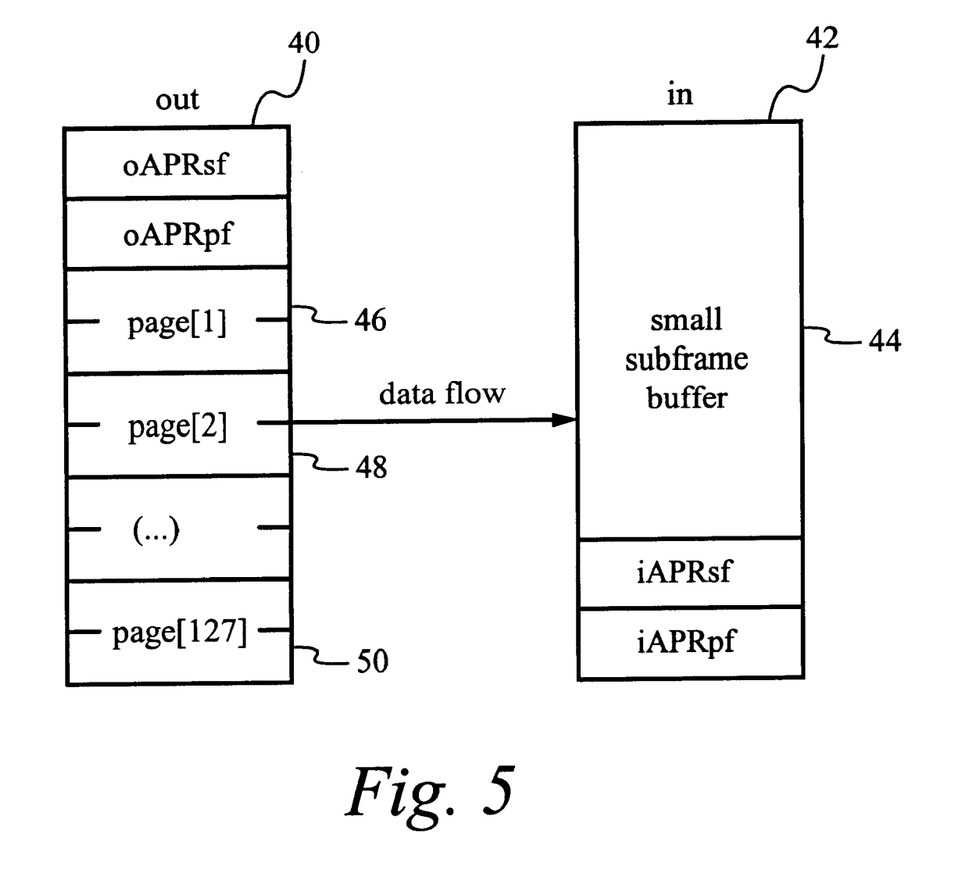
FIG. 5 illustrates a structure of a simplex subplug.

A structure of a simplex subplug is illustrated in FIG. 5. The producer device includes an output plug 40 associated with the simplex connection. The consumer device includes an input plug 42 associated with the simplex connection. Within the output plug 40, at the producer device, preferably there are two registers oAPRsf and oAPRpf and up to 127 page table entries 46–50. The register oAPRsf is a register that a consumer device updates when it is ready to receive more small frames. The register oAPRpf is a register that the consumer device updates when it is ready to receive large frame data. The page table entries 46–50 are written by the consumer device and physically located at the producer device. The page table entries 46–50 represent memory locations at the consumer device to which pages of data within a large frame transfer can be written. The data within a large frame transfer is written to each successively specified page in turn, until the entire large frame has been transferred from the producer device to the consumer device.

Within the input plug 42, at the consumer device, preferably two registers iAPRsf and iAPRpf and a small subframe segment buffer are included. The register iAPRsf is a register that the producer device updates when the small frame buffer space has been filled such that the next small frame would not fit in the remaining space. The register iAPRpf is a register that the producer device updates after completing a large frame transfer to the consumer device or the pages specified in the page table entries 46–50 have been filled by a large frame transfer. Small frames are written directly to this small subframe buffer, interrupting the processor when each write is performed. Thus, many small frames can be written before it is necessary for the producer device to update the register iAPRsf. When transferring data to the consumer device, the producer device has the option of writing a large frame into the scattered pages represented by the page table entries 46–50, or writing small frames into the small subframe buffer 44 within the plug address space of the consumer device. In an alternate embodiment, the small subframe buffer is a page or buffer within memory whose address is specified by a page table entry programmed into the connection register of the producer device.

For large frame transfers, the consumer device first performs a write operation to the register oAPRpf of the producer device and then to the following page entries 46–50, to communicate to the producer device, where the data within a large frame transfer is to be written. Preferably, this is done in a single write operation. The producer device then performs write operations to transfer the data within the large frame transfer to the page or buffer data locations specified by the addresses included within the page table entries 46–50. When all of the data within the large frame has been transferred to the scattered pages specified by the page table entries 46–50, the producer device then performs a write operation to the register iAPRpf at the consumer device, indicating that the entire frame has been transferred and also indicating the length of the frame that has been transferred. The next large frame transfer is accomplished in the same manner. However, the consumer device preferably has the ability to change the page table entries 46–50 for each different large frame transfer operation.

For small frame transfers, the consumer device first performs a write operation to the register oAPRsf of the producer device, thereby specifying that it is ready to receive a small frame transfer. The consumer device can at the same time also update the register oAPRpf and the page table entries to be ready to also receive a large frame transfer. When the producer device then is performing a transfer of a small frame, the data within the small frame is written to the small frame buffer 44 of the consumer device. Preferably, each write operation to the small subframe buffer 44 corresponds to one small frame and generates an interrupt to the consumer device. The header used within this small frame operation indicates the length of the small frame transferred, allowing the consumer device to determine the amount of data within the small subframe buffer 44 that is to be processed. When there is insufficient space available within the small subframe buffer 44, the end-of-frame indication is provided by writing to the register iAPRsf of the consumer device.

Figure 6:
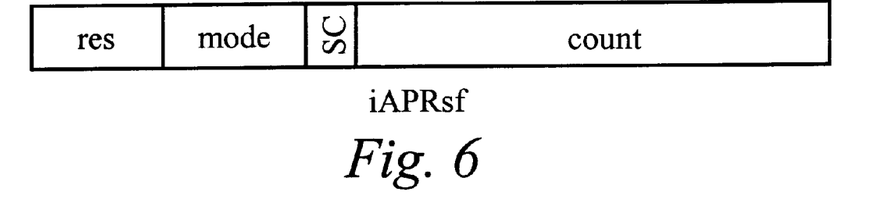
FIG. 6 illustrates a format of the register iAPRsf.

The format of the register iAPRsf is illustrated in FIG. 6. The register iAPRsf includes the fields res, mode, sc and count. The field res indicates that this portion of the register is reserved. The mode field is written to by the producer device when the space remaining within the small subframe buffer is not big enough to hold the next small frame of data or the producer device has sent the maximum number of small frames. The bit sc is a segment count bit and is set by the producer device to equal the most recent sc bit value written by the consumer device into the register oAPRsf at the producer device. The field count identifies how many bytes of data have been written by the producer device into the small subframe buffer of the consumer device.

Figure 7:
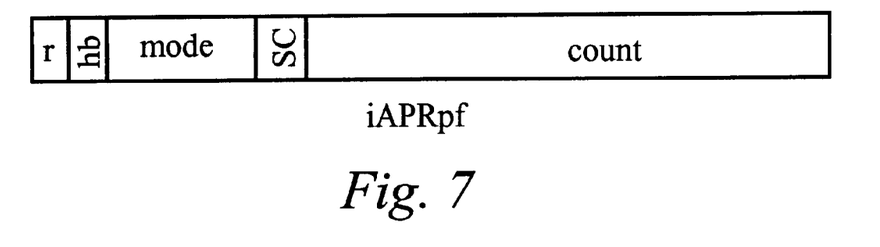
FIG. 7 illustrates a format of the register iAPRpf.

The format of the register iAPRpf is illustrated in FIG. 7. The register iAPRpf includes the fields r, hb, mode, sc and count. The field r indicates that this portion of the register is reserved. The bit hb when written indicates that the contents of this register iAPRpf have been updated and provides an interrupt to the consumer device. The field mode is preferably a two-bit field which provides frame-completion information, as specified in Table I below.

TABLE I

| Mode | Name | Description |
| --- | --- | --- |
| 0 | FREE | Initial state. Shall never be written by the producer. |
| 1 | MORE | Indication for leading (not end of frame, last) content. |
| 2 | LAST | Indication for last, end of frame content. |
| 3 | TRUNC | Indication for truncated frame content, end of frame. |

The mode FREE is an initial state that is never written by the producer device. The mode MORE is an indication that for leading content that the end of the frame has not been transferred. The mode LAST is an indication that the end of the frame has been transferred. The mode TRUNC is an indication that the frame content has been truncated, but that the end of the frame has been transferred.

Within the register iAPRpf, the bit sc is a segment count bit and is set by the producer device to equal the most recent sc bit value written by the consumer device into the register oAPRpf at the producer device. The value within the field count identifies how many bytes have been written by the producer device to the scattered pages identified in the page table elements since the last update of the register iAPRpf.

Figure 8:
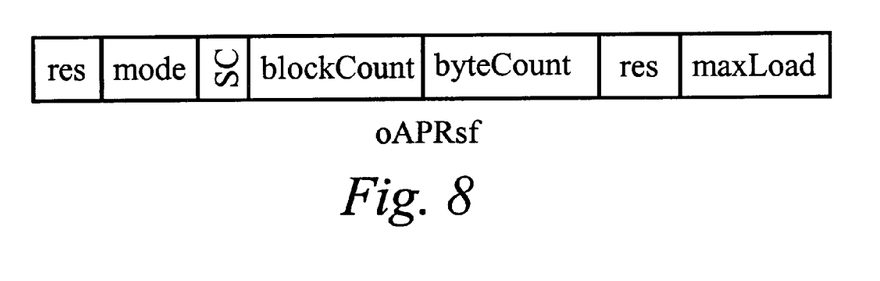
FIG. 8 illustrates a format of the register oAPRsf.

The format of the register oAPRsf is illustrated in FIG. 8. The register oAPRsf includes the fields res, mode, sc, blockCount, byteCount, res and maxLoad. The two res fields indicate that these portions of the register are reserved. The bit mode is written by the consumer device when there is space available within the small subframe buffer. The bit sc is a segment count bit and is set by the consumer device. The value of the segment count bit sc is toggled by the consumer device on each successive write to the register oAPRsf. The value included within the field blockCount represents the limit of the number of subframe blocks that can be written to the small subframe buffer. The value included within the field byteCount represents the limit of the number of bytes that can be written to the small subframe buffer. The number of interrupting small frame write operations that will be permitted is limited by both the number of actual small frames that are written, if the small frames are much less than the capacity of the small subframe buffer, and the number of bytes that are written, if the small frames are closer to the capacity of the small subframe buffer. The value included within the field maxLoad represents the maximum number of small frames that a producer device can transmit to the consumer device before updating the register iAPRsf at the consumer device.

Figure 9:
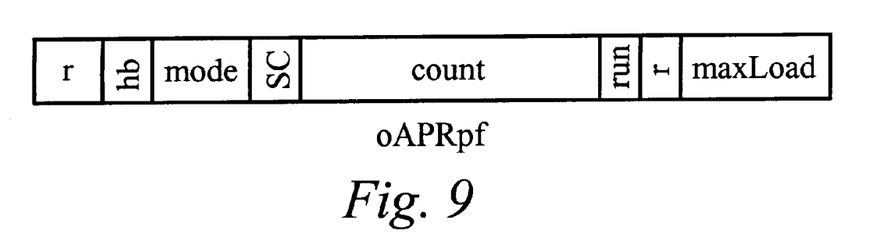
FIG. 9 illustrates a format of the register oAPRpf.

The format of the register oAPRpf is illustrated in FIG. 9. The register oAPRpf includes the fields r, hb, mode, sc, count, run, r and maxLoad. The two fields r indicate that these portions of the register are reserved. The bit hb when written indicates that the contents of this register oAPRpf have been updated by the consumer device. The bit mode is written by the consumer device when there is space available within the scattered pages to receive large frame transfers. The bit sc is a segment count bit and is set by the consumer device. The value of the segment count bit sc is toggled by the consumer device on each successive write to the register oAPRpf. The value included within the field count indicates the total number of bytes available within the scattered pages or buffers available to receive large frame transfers. The run bit enables the producer device to send large frames to the consumer device. When the value of the run bit is set to equal a logical high value, then the producer device is enabled to send large frames of data to the consumer device. When the value of the run bit is reset to equal a logical low value, then the producer device is inhibited from sending large frames of data to the consumer device. The value included within the field maxLoad represents the data-payload size limitations for individual, segment buffer write operations.

Figure 10:
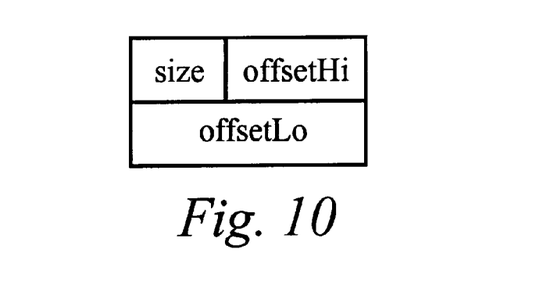
FIG. 10 illustrates a format of the page table entries.

The format of the page table entries 46–50 is illustrated in FIG. 10. Each page table entry points to a consumer segment buffer or page of memory within the dedicated IEEE 1394 memory space of the consumer device. Use of the page table entries allows a consumer device to program a list of buffers or pages of memory in possibly non-contiguous memory space for use in large frame transfers from the producer device. Preferably, each of the page table entries include the fields size, offsetHi and offsetLo. The field size is a two byte field that contains a value indicating the size of the particular page of memory represented by the page table entry. The size of pages utilized by the consumer device to receive data within a large frame transfer can vary. However, each page of memory must provide a contiguous memory space. Preferably, each page of memory utilized for large frame transfers has a size of at least 4 Kbytes. The field offsetHi is a two byte field that contains the two highest order bytes of an offset address value. The field offsetLo is a four byte field that contains the four lowest order bytes of an offset address value. Together, the values within the fields offsetHi and offsetLo form the address offset value, used to specify the beginning address of the page of memory represented by the particular page table entry.

The scattered page tables at a consumer device and the corresponding page table entries programmed at a producer device can be utilized for transfers of data from a producer device to a consumer device through any appropriate plug, including simplex plugs, duplex plugs and dual-duplex plugs.

An IEEE 1394-1995 asynchronous write transaction is utilized to transfer data from a producer device to a consumer device over a 1394TA IICP connection. Within the IEEE 1394-1995 packet of data a transaction code (tcode) is utilized to specify the packet format and type of transaction that is to be performed on the packet. As described above, in the preferred embodiment of the present invention, two segment buffers are used to receive data at the consumer device. The first buffer is the small subframe buffer which is utilized to receive small frame buffers. Write operations to this small subframe buffer cause an interrupt to occur at the consumer device. The second buffer is the large frame buffer which is made up of the scattered memory pages specified in the page table entries. The producer device writes to the control register of the consumer device when the transfer of the large frame data is complete.

In an alternate embodiment, a single segment buffer is utilized by the consumer device to receive both small frames and large frames. The data within both the small frames and large frames is written to the memory page or pages specified by the page table entries. For the transfer of small frames only, the memory page corresponding to the first page table entry is used. Within this alternative embodiment, an extended transaction code is used in packets in which an interrupt should occur at the consumer device. Accordingly, in packets transmitting a small frame of data to the first memory page, this write with interrupt transaction code is included to cause an interrupt at the consumer device when the data is written. For large frame transfers, the write with interrupt transaction code is only used when the last packet of data within the large frame of data is being transferred.

In operation, the scattering memory page tables of the present invention allow a consumer device to specify discontiguous pages in memory which together form a large frame buffer to receive large frames of data from the producer device. The consumer device programs page table entries within the plug control register at the producer device specifying the addresses of the corresponding page table entries. When transferring a large frame of data, the producer device then transmits the data utilizing write operations to the successive memory pages, specified by the page table entries, as appropriate, until the transfer of the large frame of data is complete. When the producer device has completed the transfer of the large frame of data, the producer device then updates the register iAPRpf at the consumer device to inform the consumer device that the large frame transfer is complete. The consumer device then provides the data within the scattered memory pages of the large frame buffer to the appropriate application.

When ready to receive a small frame, the consumer device appropriately updates the fields within the connection register of the producer device. When the producer device then receives a request from an application layer to transfer a small frame of data, the producer device then transmits a write data packet to write the small frame data in the small frame buffer within the connection register of the consumer device. This write operation to the small frame buffer then causes an interrupt at the consumer device. In response to this interrupt, the consumer device then provides the small frame to the appropriate application.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications can be made in the embodiment chosen for illustration without departing from the spirit and scope of the invention. Specifically, it will be apparent to one of ordinary skill in the art that the device of the present invention could be implemented in several different ways and the architecture, system and method disclosed above are only illustrative of preferred embodiments of the invention. Specifically, it will be apparent to those skilled in the art that while the preferred embodiment of the present invention is used with an IEEE 1394-1995 serial bus structure, the present invention could also be implemented on any other appropriate digital interfaces or bus structures, including other or later versions of the IEEE 1394 serial bus.

We claim:

1. A method or transferring data between a transmitting device and a receiving device comprising the steps of:
   a. sending a communication from the receiving device to the transmitting device including a notification that the receiving device is ready to receive data and a plurality of page table entries each corresponding to a location in memory or the receiving device to which the data is to be written;
   b. transferring the data from the transmitting device to the receiving device in one or more transactions to successive ones of the locations in memory corresponding to the page table entries;
   c. determining if a single transaction will include all of the data; and
   d. transferring the data to a small frame buffer at the receiving device if it is determined that the single transaction will include all of the data.

2. The method as claimed in claim 1 further comprising the step of sending a notification from the transmitting device to the receiving device upon completion of transmission of the data.

3. The method as claimed in claim 1 wherein the transfer of data to the small frame buffer causes an interrupt to occur at the receiving device.

4. The method as claimed in claim 1 wherein the small frame buffer is a buffer within a plug control register.

5. The method as claimed in claim 1 wherein an address of the small frame buffer is specified by a designated one of the page table entries.

6. The method as claimed in claim 1 wherein the locations in memory corresponding to the page table entries are not contiguous.

7. The method as claimed in claim 1 wherein together the locations in memory corresponding to the page table entries form a large frame buffer.

8. The method as claimed in claim 1 wherein the page table entries are stored at the transmitting device in a control register.

9. The method as claimed in claim 1 further comprising the step of updating the page table entries before a transfer of a next frame.

10. A method of transferring data between a transmitting device and a receiving device comprising:
    a. sending a communication from the receiving device to the transmitting device including a notification that the receiving device is ready to receive data and a plurality of page table entries each corresponding to a location in memory of the receiving device to which the data is to be written; and
    b. transferring the data from the transmitting device to the receiving device in one or more transactions to successive ones of the locations in memory corresponding to the page table entries;
       wherein the one or more transactions include an extended transaction code specifying whether or not an interrupt is to occur upon completion of the transaction.

11. The method as claimed in claim 10 wherein a final transaction within a frame of data includes the extended transaction code specifying that the interrupt is to occur upon completion of the transaction.

12. The method as claimed in claim 1 wherein the transmitting device and the receiving device are coupled together by an IEEE 1394 serial bus.

13. The method as claimed in claim 12 wherein the transmitting device and the receiving device operate according to a version of the 1394TA IICP specification.

14. A method of transferring data between a transmitting device and a receiving device comprising the steps of:
    a. sending a small frame control communication from the receiving device to the transmitting device including a notification that the receiving device is ready to receive a small frame of data;
    b. sending a large frame control communication from the receiving device to the transmitting device including a notification that the receiving device is ready to receive a large frame of data and a plurality of page table entries each corresponding to a location in memory of the receiving device to which portions of the large frame of data are to be written;
    c. receiving a frame of data from an application at the transmitting device;
    d. determining if the received frame of data is a small frame of data or a large frame of data;
    e. transferring the received frame of data to a small frame buffer at the receiving device if it is determined that the received frame of data is a small frame of data; and
    f. transferring the received frame of data from the transmitting device to the receiving device in multiple transactions to successive ones of the locations in memory corresponding to the page table entries if it is determined that the received frame of data is a large frame of data.

15. The method as claimed in claim 14 further comprising the step of sending a notification from the transmitting device to the receiving device upon completion of transmission of the large frame of data.

16. The method as claimed in claim 14 wherein the transfer of data to the small frame buffer causes an interrupt to occur at the receiving device.

17. The method as claimed in claim 14 wherein the small frame buffer is a buffer within a plug control register.

18. The method as claimed in claim 14 wherein an address of the small frame buffer is specified by a designated one of the page table entries.

19. The method as claimed in claim 14 wherein together the locations in memory corresponding to the page table entries form a large frame buffer.

20. The method as claimed in claim 14 wherein the locations in memory corresponding to the page table entries are not contiguous.

21. The method as claimed in claim 14 wherein the page table entries are stored at the transmitting device in a control register.

22. The method as claimed in claim 14 wherein a small frame of data is transferred in a single transaction and a large frame of data is transferred in more than one transaction.

23. The method as claimed in claim 14 further comprising the step of updating the page table entries before a transfer of a next frame.

24. The method as claimed in claim 14 wherein the transmitting device and the receiving device are coupled together by an IEEE 1394 serial bus.

25. The method as claimed in claim 24 wherein the transmitting device and the receiving device operate according to a version of the 1394TA IICP specification.

26. A transmitting device configured to transmit data to a receiving device comprising:
   a. an interface configured for coupling to the receiving device to transmit frame data to the receiving device and receive control data from the receiving device; and
   b. a register coupled to the interface to store the control data, wherein the register includes a plurality of page table entries which are programmed by the receiving device and hold address data corresponding to locations in memory of the receiving device to which a frame of data is to be written;
      wherein the transmitting device transmits the frame of data to the receiving device in one or more transactions through the interface to successive ones of the locations in memory corresponding to the page table entries and further wherein the one or more transactions include an extended transaction code specifying whether or not an interrupt is to occur upon completion of the transaction.

27. The transmitting device as claimed in claim 26 wherein the locations in memory corresponding to the page table entries are not contiguous.

28. The transmitting device as claimed in claim 26 wherein together the locations in memory corresponding to the page table entries form a large frame buffer.

29. The transmitting device as claimed in claim 26 wherein the receiving device has the ability to update the page table entries between transfer of each frame.

30. The transmitting device as claimed in claim 26 wherein a final transaction within a frame of data includes the extended transaction code specifying that the interrupt is to occur upon completion of the transaction.

31. The transmitting device as claimed in claim 26 wherein the transmitting device is configured to transmit data to the receiving device over an IEEE 1394 serial bus.

32. The transmitting device as claimed in claim 31 wherein the transmitting device and the receiving device operate according to a version of the 1394TA IICP specification.

33. A receiving device configured to receive data from a transmitting device comprising:
   a. an interface configured for coupling to the transmitting device to receive frame data from the transmitting device and transmit control data to the transmitting device;
   b. a plurality of memory pages which together form a fame buffer, each of the memory pages having a corresponding address; and
   c. a small frame buffer coupled to the interface for storing a small frame of data transmitted from the transmitting device in a single transaction;
      wherein the receiving device transmits the control data to the transmitting device including the address of the plurality of memory pages and the transmitting device will transmit the frame data to the receiving device in one or more transactions through the interface to successive ones of the plurality of memory pages.

34. The receiving device as claimed in claim 33 wherein the small frame buffer is a buffer within a plug control register.

35. The receiving device as claimed in claim 33 wherein an address of the small frame buffer is specified by a designated one of the page table entries.

36. The receiving device as claimed in claim 33 wherein the locations of plurality of memory pages are not contiguous.

37. The receiving device as claimed in claim 33 wherein the page table entries are stored at the transmitting device in a control register.

38. The receiving device as claimed in claim 33 wherein the receiving device has the ability to update the page table entries between transfer of each frame.

39. A receiving device configured to receive data from a transmitting device comprising:
   a. an interface configured for coupling to the transmitting device to receive frame data from the transmitting device and transmit control data to the transmitting device; and
   b. a plurality of memory pages which together form a frame buffer, each of the memory pages having a corresponding address; and
      wherein the receiving device transmits the control data to the transmitting device including the addresses of the plurality of memory pages and the transmitting device will transmit the frame data to the receiving device in one or more transactions through the interface to successive ones of the plurality of memory pages and further wherein the one or more transactions include an extended transaction code specifying whether or not an interrupt is to occur upon completion of the transaction.

40. The receiving device as claimed in claim 39 wherein a final transaction within a frame of data includes the extended transaction code specifying that the interrupt is to occur upon completion of the transaction.

41. The receiving device as claimed in claim 33 wherein the transmitting device is configured to transmit data to the receiving device over an IEEE 1394 serial bus.

42. The receiving device as claimed in claim 41 wherein the transmitting device and the receiving device operate according to a version of the 1394TA IICP specification.

43. A communication system comprising:
   a. a transmitting device including:
      i. a first interface for transmitting frame data and receiving control data; and
      ii. a first control register coupled to the first interface to store the control data including a plurality of page table entries; and
   b. a receiving device including:
      i. a second interface coupled to the first interface to receive the frame data from the transmitting device and transmit control data to the transmitting device;
      ii. a second control register coupled to the second interface; and
      iii. a plurality of memory pages which together form a large frame buffer, each of the memory pages having a corresponding address, wherein the receiving device transmits the control data to the transmitting device including the addresses of the plurality of memory pages which are stored in the plurality of page table entries and further wherein the transmitting device transmits the frame data to the receiving device in one or more transactions to be written into successive ones of the plurality of memory pages.

44. The communication system as claimed in claim 43 wherein the receiving device further comprises a small frame buffer coupled to the second interface for storing a small frame of data transmitted from the transmitting device in a single transaction.

45. The communication system as claimed in claim 44 wherein the small frame buffer is included within the second control register.

46. The communication system as claimed in claim 44 wherein an address of the small frame buffer is specified by a designated one of the page table entries.

47. The communication system as claimed in claim 43 wherein the plurality of memory pages are not contiguous.

48. The communication system as claimed in claim 43 wherein the receiving device has the ability to update the page table entries between transfer of each frame.

49. The communication system as claimed in claim 43 wherein the one or more transactions include an extended transaction code specifying whether or not an interrupt is to occur upon completion of the transaction.

50. The communication system as claimed in claim 49 wherein a final transaction within a frame of data includes the extended transaction code specifying that the interrupt is to occur upon completion of the transaction.

51. The communication system as claimed in claim 43 wherein the first and second interfaces are coupled together by an IEEE 1394 serial bus.

52. The communication system as claimed in claim 51 wherein the transmitting device and the receiving device both operate according to a version of the 1394TA IICP specification.

* * * * *

UNITED STATES PATENT AND TRADEMARK OFFICE
CERTIFICATE OF CORRECTION

PATENT NO.     : 6,421,745 B1
DATED          : July 16, 2002
INVENTOR(S)    : David V. James et al.

It is certified that error appears in the above-identified patent and that said Letters Patent is hereby corrected as shown below:

Title page,
Item [56], References Cited, OTHER PUBLICATIONS, delete "P134" and insert -- P1394 --.

Column 15,
Line 60, delete "fame" and insert -- frame --.

Signed and Sealed this

Twenty-fifth Day of March, 2003

JAMES E. ROGAN
*Director of the United States Patent and Trademark Office*